L. STEINBERGER.
INSULATOR.
APPLICATION FILED JULY 3, 1911.
Reissued Oct. 17, 1916.
14,204.
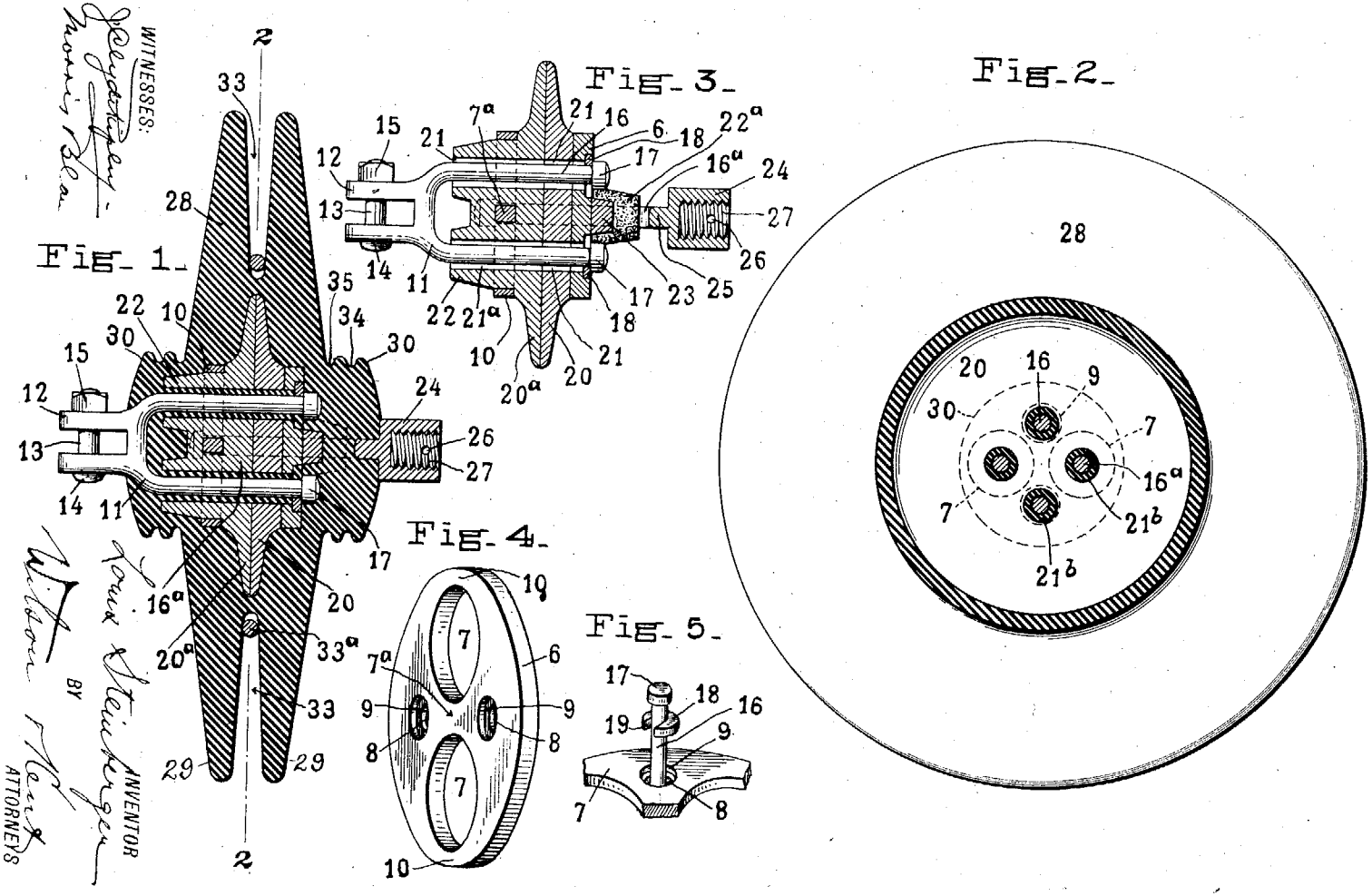
WITNESSES:
J. Clyde Kelly
Morris Blau
INVENTOR
Louis Steinberger
BY
Wilson & Kent
ATTORNEYS

UNITED STATES PATENT OFFICE.

LOUIS STEINBERGER, OF BROOKLYN, NEW YORK.

INSULATOR.

14,204. Specification of Reissued Letters Patent. Reissued Oct. 17, 1916.

Original No. 927,187, dated July 6, 1909, Serial No. 393,088, filed September 16, 1907. Application for reissue filed July 3, 1911. Serial No. 636,737.

*To all whom it may concern:*

Be it known that I, LOUIS STEINBERGER, residing at Brooklyn, in the county of Kings and State of New York, have invented certain new and useful Improvements in Insulators, of which the following is a specification.

My invention relates to insulators employed in general electrical work and more particularly for service in high tension work, and in instances where the insulator is subjected to great mechanical strain and high voltage.

Among the several objects of my invention are the following: I, to encircle the metallic tension members with several concentric tubular members of insulating material, thereby increasing the dielectric properties of the insulator; II, to insulate certain internal parts of the structure with insulating material having properties adapting it to resist mechanical stresses, and to cover the outer portions of the device with insulating material rendering it fireproof, waterproof, and otherwise suitable for out-door exposure; III, to increase the mechanical strength of the insulator by providing it with disks having bridges integral therewith and having shapes and relative positions giving exceptional advantages as regards mechanical stresses; IV, to enable the insulator to be assembled without the necessity for disconnecting the tension members from any fastenings which may engage them; V, to provide certain parts of the insulating material with tubular portions integral therewith and extending along the tension members for the purpose of protecting points beyond the bounds of the particular body of insulating material with which they are integrally connected; VI, to provide the tension members with fastenings of an improved kind which may be placed in position after the tension members are placed approximately in position; VII, to sink the fastening members last mentioned into the body portions of the device for the purpose of more readily holding the fastening members in position; VIII, to give the exterior of the insulator such conformity as to tend more effectively to prevent arcing and surface leakage, and also to adapt the device for supporting wires in various relations; IX, to provide tension members with fastening members of such conformity as to enable one to attach or remove them at will; X, to provide tension disks having portions raised relatively to the surface upon which fastenings rest, so as to retain the fastenings more securely in place when the device is put under stress; XI, to provide a disk insulator of such construction that it may be connected to other insulators either rigidly or flexibly.

Reference is to be had to the accompanying drawings forming a part of this specification, in which similar characters of reference indicate corresponding parts in all the figures.

Figure 1 is a vertical, central section through an insulator made in accordance with my invention and showing the relative positions of the inner body of insulating material and the outer body of insulating material, the inner body of insulating material having tubular portions extending through it, this view also showing how the tension members are connected with the metallic disks and with the insulating material of the insulator; Fig. 2 is a vertical cross section taken upon the line 2—2 of Fig. 1 and showing more particularly the arrangement of the tension members and the insulating members; Fig. 3 is a vertical section somewhat similar to Fig. 1 but showing the outer covering of insulating material as omitted, the device in this figure being capable of use, if desired, without the addition of the outer member of insulating material shown in Fig. 1; Fig. 4 is a perspective of one of a pair of metallic disks, for receiving the mechanical stress due to the pull upon the device when in use, this view showing the various apertures necessary for connecting the various parts properly in position; and Fig. 5 is a fragmentary perspective somewhat similar to the top of Fig. 4 and showing in addition a portion of one of the tension members, and the fastening member for preventing the withdrawal of the tension member from the disk upon which it exerts mechanical stress.

A pair of metallic disks 6 are each provided with two circular apertures 7 of considerable size and with two smaller apertures 8 also circular, the disk being further provided with annular shoulders 9 disposed adjacent to the apertures 8. In effect, the apertures 8 are holes provided with countersinks into which they merge. Each disk 6 is provided with a bridge 7ª integral therewith, this bridge simply representing the portion of material remaining between the apertures 7. Each disk 6 is further provided with thin portions 10 representing the material left between each aperture 7 and the adjacent edge of the disk. A tension member 11 is provided with flattened lugs 12 integral therewith and connected together by a bolt 13. This bolt 13 extends through the lugs 12 and is provided with a head 14 and with a revoluble nut 15 whereby it may be connected to the wire, cable or analogous member to be used as a support for the insulator. The tension member 11 is provided with two prongs 16, each having a head 17 integral therewith and produced thereupon by upsetting the ends of the prongs. Washers 18 each having a slot 19, are made of a size enabling them to be fitted against the shoulders 9 (see Fig. 5). The slot 19 of each washer 18 is preferably of such width that the washer must be driven forcibly upon the prong 16 in order to grip it tightly.

At 20, 20ª are two disks of insulating material of a kind adapted to resist compression stresses and each comprising a body portion and an annular rib or flange projecting radially therefrom. The flange and body portion of each disk are formed with a continuous flat face at one side of the respective disk, and these flat faces are therefore relatively large, and are adapted to engage and press against each other for resisting tensile strains in the parts connected to the disks. When the disks 20, 20ª are fitted together (see Fig. 3) they constitute to all intents and purposes, a single disk provided with a comparatively wide and thin edge formed by the contacting flanges of the disk.

When the parts are assembled as hereinafter described, and as indicated in Fig. 3, they comprise practically a composite body of insulating material provided with holes 21 extending entirely through it, and further provided with tubular extensions 22 and with webs 23, these webs, one at each end of the insulator, crossing each other. A socket 24 is mounted integrally upon a tension member 25, the latter being divided into two prongs 16ª exactly like the prongs 16. The socket 24 is provided with a hole 26 extending diametrically through it and is provided internally with a thread 27 for the purpose of engaging a threaded bolt or other member, in order to enable one end of the insulator to be suspended or otherwise sustained, or connected with any other member.

In order to assemble the parts shown in Fig. 3, the disks 20 and 20ª, of insulating material, are fitted respectively with the two metal disks 6, the latter being preferably, partially embedded in the material of said disks, as by having the bridges 7ª extending through the webs 23. The tubular extensions 22 project through and beyond the apertures 7. The disks are then so disposed that the holes 8 of one of them will stand substantially in axial alinement with the apertures 7 of the other. In this manner the bridges 7ª extend crosswise of each other. The prongs of the tension members are next inserted, the heads 17 being passed through the holes 21 and 8, and the washers 18 being driven laterally upon the prongs and brought to rest on the countersinks 9. The device is now ready to use if no further insulation than that indicated in Fig. 3 is required. It is desirable, however, to provide further insulation and also to prevent the entrance of water into the parts shown in Fig. 3. In such event, I add a body 28 of insulating material, shaping it so as to form disks 29, and further provide it with ends 30 and with annular corrugations 31, 32. The disks 29 are separated from each other by an annular groove 33 which may be used to advantage in receiving a wire 33ª. The corrugations 31, 32, are separated by grooves 34, 35. The grooves 34, 35 may also be used to receive one or more wires. The corrugations 31, 32 and the disks 29 facilitate the dripping of moisture and also avoid the tendency for the current to leak. If for any reason it may be necessary to let the insulator down to the ground it has a tendency to remain upon the edges of the disks 29 and thus to avoid the necessity for the wires, cables or guys coming into contact with the earth.

The outer member 28 of insulating material is preferably added after the other parts of the device are asesmbled, as shown in Fig. 3, and may be applied by forcing the insulating material while in a plastic condition, into and around the parts shown in Fig. 3. The material of the outer insulating body is forced into the holes 21 and 8 so as to constitute tubular members extending practically throughout the entire length of the inner body of insulating material, including the tubular extensions 22 of the same. By this means each prong 16 is encircled by a sleeve 21ª of insulating material having one dielectric constant. These sleeves being encircled by a single body of insulating material having a different dielectric constant, and this body being enveloped in a mass of insulating material having the same dielectric constant as the sleeve 21ª, as will be understood from Fig. 2. The ends 30 of the outer body of insulating material may be about flush with the inner edge of the socket 24 at one end of the strain and may be caused to envelop a considerable part of the tension member 11 at points extending considerably outward from the center of the insulator. The sleeves 21ª, as well as the outer covering 28 of insulating material, serve to hold the disks 20 and 20[a] in fixed relation to each other. The sleeves alone, by closely filling the holes 21 as they do, effectually prevent relative edgewise movement of the disks and also serve, to a degree, in preventing any separating movement of the disks.

It will be noted from the above description that I have produced an insulator affording considerable mechanical strength in proportion to the sizes and quantities of material used, and also affording high dielectric qualities. The efficiency of the insulator may be increased by building one part of it with a view to standing great mechanical stresses coupled with considerable dielectric strains, and yet constructing another portion of the insulator of insulation adapted to render the construction waterproof and fireproof. Any number of these insulators may be connected together or connected to insulators of different form in series so as to increase the aggregate insulation. The insulators may be arranged with their axes either horizontal or vertical.

I do not limit myself to the exact form, nor to the details of any or all of the parts above shown and described, nor do I limit myself to any particular combination of the parts, nor to the use of any prescribed materials, but prefer to use for the outer body portion shown in Fig. 1 the material well known in this art as "electrose"; for the inner insulating portion shown in Fig. 3 I may employ either electrose of a more distinctive waterproof and fireproof material, or any other suitable material.

It will be evident to those skilled in the art that many changes in the construction, form and arrangement of the parts may be resorted to without departing from the spirit or scope of my invention.

Having thus described my invention, I claim as new and desire to secure by Letters Patent:—

1. An insulator, comprising a plurality of disks of insulating material provided with holes, tension members provided with prongs for extending through said holes, and further provided with heads, and fastening members for engaging said prongs and thus preventing the retrogression of said heads through said holes.

2. An insulator, comprising a body, tension members of conducting material, and an outer covering of insulating material provided with a body portion having annular corrugations encircling it, and also having disks integral with it, said disks being disposed in close proximity to each other and merging together at one point.

3. An insulator, comprising a body portion of insulating material provided with tubular extensions of insulating material projecting outwardly from the ends of said body portion, said body portion being further provided with webs connecting together certain of said tubular extensions, and tension members extending entirely through said body portion of insulating material and through said tubular extensions, said tension members being further provided with means for preventing their withdrawal from said body portion.

4. An insulator, comprising a pair of disks of insulating material, each provided with tubular extensions mounted thereupon and rigid relatively thereto, the tubular extensions of one disk being staggered relatively to those of another, and a plurality of metallic members provided with portions extending through said disks of insulating material and through said tubular extensions.

5. In an insulator, the combination of a plurality of disks of insulating material, each provided with a hole extending entirely through it, said disks being in registry with each other, metallic members extending through said holes and provided with means to prevent their withdrawal through said holes, and a body of insulating material enveloping said disks and portions of said metallic members, said body of insulating material extending integrally into said holes and disposed intermediate said metallic members and said disks.

6. An insulator, comprising a body of insulating material provided with tubular extensions integral therewith, and further provided with holes extending through said body and through said tubular extensions, tension members extending through said holes and tubular extensions, and means for preventing the withdrawal of said tension members from said body of insulating material.

7. An insulator, comprising a plurality of disks of metal each provided with apertures and with a bridge bounding said apertures, the bridge of one disk being disposed across the bridge of another disk, each disk being provided with holes disposed adjacent to the ends of the bridge of that disk, a body of insulating material disposed intermediate said disks, tension members extending through said holes in said disks of metal and through said body of insulating material, and means for preventing movement of the tension member through said holes in one direction.

8. An insulator, comprising a main body of insulating material provided with a disk and with extensions integral therewith, and further provided with holes extending through said main body and continued through said extensions, tension members following said holes and thus extending through said main body of insulating material and through said extensions, and means for securing said tension members relatively to said body of insulating material.

9. An insulator, comprising a plurality of metallic disks provided with apertures, and also provided with holes, a member of insulating material disposed intermediate said disks and provided with integral portions extending through said apertures, and tension members extending through said holes and through said extending portions.

10. An insulator, comprising a body of insulating material provided with a plurality of disks comparatively large in diameter merging together and made integral with said body of insulating material, and strain members connected with said body portion.

11. An insulator, comprising a plurality of disks of insulating material, said disks being of comparatively large diameter and disposed closely together so as to form an external annular pocket for the purpose of engaging opposite portions of a conductor disposed intermediate said disks.

12. An insulator, comprising a plurality of disks of insulating material, said disks being of comparatively large diameter and disposed closely together, so that one merges into the other in such manner as to form an annular groove for receiving a separate conductor, and means for connecting tension members with said disks for the purpose of supporting the latter.

13. In an insulator, the combination comprising a plurality of separately formed disks of insulating material having opposing flat faces contacting; insulating means extending through said disks for retaining said disks in coöperative alinement; and strain members fixed one to each of said disks.

14. In an insulator, the combination comprising a plurality of separately formed disks of insulating material having opposing faces contacting; insulating means for retaining said disks in coöperative alinement; and strain members extending through and being fixed to said disks respectively.

15. In an insulator, the combination comprising a plurality of separately formed disks of insulating material having opposing faces contacting; means for retaining said disks in coöperative alinement; strain members fixed one to each of said disks disposed to force opposing faces of said disks toward each other, and said disks being formed with radially projecting flanges, the flange of one disk contacting with the flange of the other for assisting said disks in resisting the pressure of said tension members.

16. In an insulator, the combination comprising a plurality of separately formed juxtaposed disks formed with flanges; and tension members fixed to said disks; the flange of one disk contacting with the flange of another for resisting the pressure of said tension members.

17. In an insulator, the combination comprising a pair of separately formed disks of insulating material, strain members connected to said disks respectively disposed to force said disks toward each other, said disks being formed with apertures through which said strain members extend; and means within said apertures entirely surrounding said strain members serving to retain said disks in coöperating relation.

18. In an insulator, the combination comprising a pair of separately formed disks of insulating material, strain members connected to said disks respectively disposed to force said disks toward each other, said disks being formed with apertures through the material thereof and being disposed with said apertures substantially in axial alinement; and tubular sleeves extending through said alined apertures serving to retain said disks in coöperative relation, and to receive one of said strain members.

19. In an insulator, the combination comprising a pair of disks, strain members connected to said disks respectively disposed to force said disks toward each other; a pair of separately formed disks of insulating material one fixed to the opposing face of each of said first disks, having themselves opposing faces of considerably greater extent than the opposing faces of said first disks, contacting for resisting the pressure of said strain members.

20. In an insulator, the combination comprising a pair of disks, strain members connected to said disks respectively disposed to force said disks toward each other; and a pair of separately formed disks of insulating material one fixed to and movable with each of said first disks, having opposing faces disposed to contact with each other to resist the pressure of said strain members.

21. In an insulator, the combination comprising a pair of separately formed disks of insulating material; and a pair of metallic disks partly embedded one in each of said first disks adapted to serve as retaining means for strain members disposed so as to force said first disks toward each other.

22. In an insulator, the combination comprising a pair of disks, a pair of strain members adapted to force said disks toward each other; and metallic members partly embedded within the material of the respective disks reinforcing said disks, adapted to serve as retaining means for said strain members, and being formed independently of said strain members.

23. In an insulator, the combination comprising a pair of separately formed juxtaposed disks of insulating material each formed with a plurality of independent apertures through the material thereof, said disks being disposed so that the respective apertures stand substantially in axial alinement; each of said disks being provided with means adapted to retain a strain member and coöperating to resist the pressure of said strain member; and means extending through the respective axially alined apertures serving to hold said disks in coöperative relation and being extended beyond said apertures and enveloping said disks.

24. In an insulator, the combination comprising a pair of disks, a pair of strain members adapted to force said disks toward each other; and metallic members partly embedded within the material of the respective disks reinforcing said disks, adapted to serve as retaining means for said strain members, and being formed with apertures through which project portions of said disks.

25. In an insulator, the combination comprising a pair of disks having strain members connected thereto respectively adapted to force said disks toward each other; and a body of insulating material interposed between the opposing surfaces of said disks having parts extending through apertures formed in said disks.

26. In an insulator, the combination comprising a pair of separately formed disks of insulating material; a pair of metallic disks connected one to each of said first disks, so as to constitute two elements, each element comprising a disk of insulating material and a metallic disk, the two elements being disposed with the opposing surfaces of the disks of insulating material contacting with each other, strain members disposed to urge said elements toward each other, and means whereby the metallic disks serve as attaching means for the strain members.

27. In an insulator, the combination comprising a pair of separately formed coöperating insulating disks; a pair of metallic disks fixedly connected one to each of the insulating disks formed with parts whereby to serve as means for connecting strain members to said insulating disks, and a pair of strain members one connected to each of said insulating disks by being attached to said metallic disks.

28. In an insulator, the combination comprising a pair of separately formed coöperating insulating disks; and a pair of metallic disks partly embedded one in each of the insulating disks, said metallic disks being formed with means for retaining strain members connected to said insulating disks.

29. In an insulator, the combination comprising a pair of separately formed juxtaposed disks of insulating material each formed with a plurality of independent apertures through the material thereof, said disks being disposed so that the respective apertures stand substantially in axial alinement; each of said disks being provided with means adapted to retain a strain member, said disks being arranged in opposing relation to resist the pressure of said strain members; and means extending through the respective axially alined apertures serving to hold said disks in coöperative relation.

30. A two-part insulating structure for strain insulators each of said parts comprising an insulating member and a reinforcing member, the insulating members being arranged with opposing faces contacting in a plane transverse to the line of strain.

31. A strain insulator comprising a pair of strain members each having an insulating part connected thereto, and said insulating parts having contacting surfaces arranged in opposed relation in a plane transverse to the line of strain.

32. A strain insulator comprising a pair of disks spaced apart and each having an insulating medium over their opposing faces, said insulating mediums having surface portions contacting with each other, and opposed strain members one engaging each of said disks so as to force said insulating mediums into opposed relation with each other in resisting the pull of the strain members.

In testimony whereof I have affixed my signature in the presence of two witnesses.

LOUIS STEINBERGER.

Witnesses:
FRANK J. KENT,
MAY E. KADERLY.

Copies of this patent may be obtained for five cents each, by addressing the "Commissioner of Patents Washington, D. C."